(12) United States Patent
Guyot et al.

(10) Patent No.: US 6,260,826 B1
(45) Date of Patent: Jul. 17, 2001

(54) METHOD FOR LAYING A CABLE BENEATH A SLAB

(75) Inventors: Jean-Luc Guyot, Gif sur Yvette; Daniel Kerlau, Chatenay Malabry, both of (FR)

(73) Assignee: Compagnie Generale des Matieres Nucleaires, Velizy-Villacoublay (FR)

( * ) Notice: Subject to any disclaimer, the term of this patent is extended or adjusted under 35 U.S.C. 154(b) by 0 days.

(21) Appl. No.: 09/623,299
(22) PCT Filed: Mar. 4, 1999
(86) PCT No.: PCT/FR99/00491
  § 371 Date: Sep. 1, 2000
  § 102(e) Date: Sep. 1, 2000
(87) PCT Pub. No.: WO99/45618
  PCT Pub. Date: Sep. 10, 1999

(30) Foreign Application Priority Data

Mar. 5, 1998 (FR) .................................................. 98 02703

(51) Int. Cl.[7] .................................................. B65H 54/00
(52) U.S. Cl. .................................. 254/134.3 R; 254/134.4
(58) Field of Search .................. 254/134.3 R, 134.3, 254/134.4, 134.3 FT

(56) References Cited

U.S. PATENT DOCUMENTS

| | | | |
|---|---|---|---|
| 1,865,113 | * 5/1932 | Kiesel | 254/134.4 R |
| 3,034,766 | * 5/1962 | Hamrick | 254/134.3 R |
| 3,382,859 | * 5/1968 | Myers | 254/134.4 |
| 4,382,581 | 5/1983 | Wimer et al. | . |
| 6,003,842 | * 12/1999 | Hug | 254/134.3 FT |
| 6,109,595 | * 8/2000 | Lecours | 254/134.4 |

OTHER PUBLICATIONS

Patent Abstracts of Japan, Publication No.: 63305712, Publication Date: Dec. 13, 1988, Nuclear Reactor.

* cited by examiner

Primary Examiner—Joseph J. Hail, III
Assistant Examiner—Lee Wilson
(74) Attorney, Agent, or Firm—Pearne & Gordon LLP

(57) ABSTRACT

The invention relates to a process for blind placement of a cable under a slab (14) such as a slab closing off a storage silo for the storage of noxious products, between two openings (24, 34). A target (42) is lowered through one (24) of the openings and a gun (38) is lowered through the other opening (34). The target (42) and the gun (38) are rotated to face each other and a projectile such as a harpoon (40) is then fired with a gun towards the target, after attaching a hemp rope (44) to the harpoon. After lifting the target (42) above the slab (14) and disconnecting the harpoon (40), the cable is attached to the other end of the hemp rope and the hemp rope is pulled through the opening (24) until the cable is put into place.

14 Claims, 3 Drawing Sheets

METHOD FOR LAYING A CABLE BENEATH A SLAB

TECHNICAL DOMAIN

This invention relates to a process for placement of a cable under a slab between two openings passing through the slab, without any human intervention under the slab.

In this case, and throughout this text, the term "cable" refers to any flexible, elementary or complex device such as a rope, an electrical cable and/or optical cable, hose, etc.

The process according to the invention may be used in all cases in which it is required to put a cable into position under a slab between two openings formed in the slab, when human intervention under the slab is impossible. Thus, and solely as an example, a process of this type may be used for a cable placed under a slab for closing off a silo used for long term storage of liquid or solid noxious products such as products with radioactive properties in the nuclear industry.

STATE OF PRIOR ART

As shown diagrammatically in FIGS. 1 and 2 in the attached drawings, large parallelepiped or cylindrical shaped concrete silos 10 are used for the long term storage of liquid or solid products 12 with dimensions up to, or possibly greater than 10 m. When the stored products are noxious waste, these silos are covered with a thick protective concrete slab 14.

Collection equipment 16 is used when it is required to pick up waste 12 contained in this type of silo 10 or to work in a specific location inside the silo. For example, this collection equipment may consist of a grab in the case of solid waste or a stirring/pumping unit in the case of liquid waste.

The collection equipment 16 is fixed to the lower end of a lifting cable 18, the upper end of which is wound around the drum of a lifting winch 20. This lifting winch 20 is located in a collection cell 22 above the slab 14 in line with an opening 24, usually formed near the center of the slab 14.

A blind guide system is also placed under slab 14 so that the collection equipment 16 can also be located vertically in line with the location at which the waste 12 to be picked up or pumped is located.

This blind guide system comprises a guide device 26 on which the lifting cable 18 slides. The guide device 26 is itself positioned and moved in the upper part of the silo 10 by means of at least three positioning cables 28 (four cables are shown in FIG. 2). One of the ends of each of the positioning cables 28 is fixed onto the guide device 26. The other end of each cable 28 is wound onto the drum of a positioning winch 30 located above and in line with another opening 32 formed in the slab 14 adjacent to its periphery.

Therefore in this type of guide system, each positioning cable 28 is wound onto a winch 30, then passes through an opening 32 formed in a peripheral part of the slab 14 and passes under this slab, and is finally fixed on the guide device 26 of the lifting cable 18.

When a storage silo 10 was not equipped with this type of lifting cable guide system 18 when it was first built, there will be problems in placing the positioning cables 28 under the slab 14, and these problems have not effectively been solved as yet. They are due to the fact that human intervention inside an existing silo is impossible for safety reasons.

The initial position of the guide device 26 adjacent to the opening 24 formed in the central part of the slab 14 does not cause any particular problems. On the other hand, at the present time there is no known technique for connecting this guide device 26 to the positioning winches 30 placed above the peripheral openings 32 by means of positioning cables 28. In other words, it is not known how to pass a cable blind under a slab between two openings at a certain distance from each other passing through this slab.

DESCRIPTION OF THE INVENTION

The purpose of this invention is a process capable of placing a cable under a slab between two openings in the slab at a certain distance from each other, blind, in other words without human intervention underneath the slab.

According to the invention, this result is achieved using a process for placement of a cable under a slab between a first and a second opening passing through the slab, characterized by the fact that it comprises the following steps:

lower a cable under the slab through the first opening, and rotate the target towards the second opening;

lower a gun under the slab through the second opening, and rotate the gun towards the target;

fire a projectile from the gun, attached to a cable or a hemp rope that can be connected to a cable, this projectile being caught by the target;

raise the target above the slab through the first opening, and disconnect the cable or the hemp rope.

The cable may be fixed directly to the projectile when it is sufficiently lightweight to not reduce the precision of firing due to the drag effect. In all other cases, a strong lightweight hemp rope is used that can be attached to the cable afterwards so that the cable is pulled under the slab using the hemp rope.

In one preferred embodiment of the invention, the target comprises a frame supporting a net and the projectile is a harpoon designed to get trapped in this net.

The target is advantageously suspended from a support by a rigid vertical rod. The target is then lowered until the support comes into contact with the upper face of the slab around the first opening.

In order to orient the target, the rod is rotated about itself with respect to the support. More precisely, the target is oriented by making an arrow fixed onto the rod above the slab coincide with a graduation of a fixed horizontal dial placed above the slab and centered on the rod, this graduation indicating the direction of the second hole.

In particular, the target may be lowered by means of a sling connected to a winch located above the first opening.

In the preferred embodiment of the invention, the projectile is loaded onto the gun after the gun is lowered under the slab. More precisely, the gun is loaded through the top by inserting the projectile vertically through a loading duct that passes through the second opening.

In order to prevent any risk of the hemp rope or the cable getting blocked during firing, it is beneficial to unwind the length of the hemp rope or the cable before firing, the length being equal to at least the distance separating the openings starting from a winder placed above the second opening.

The length of the hemp rope or the cable thus unwound before firing fits into a bowl placed under the gun, particularly when there is no liquid above the solid waste, to prevent the cable from getting wet, which would make the firing parameters difficult to control.

In order to rotate the gun into the right direction, it is lowered until it comes into contact with a stop to define a previously adjusted elevation angle, and it is rotated in azimuth by pivoting the gun around a vertical axis through the second opening. In order to determine this orientation in azimuth, a needle fixed on the gun pivot axis above the slab may be made to coincide with a mark on a second dial fixed horizontally above the slab and centered on this pivot axis, this mark indicating the direction of the first hole.

After firing, the target is raised above the slab through the first opening and the hemp rope or the cable is detached from the projectile.

When the projectile is fixed on a hemp rope distinct from the cable to be installed, the other end of the hemp rope is then fixed to a first end of the cable and the hemp rope is pulled through the first opening until the first end of the cable is recovered.

When the cable forms part of a blind guide system that is to be installed in the upper part of an existing storage silo, the other end of the cable is fixed to a winch located above the second opening.

BRIEF DESCRIPTION OF THE FIGURES

As a non restrictive example, we will now define a preferred embodiment of the invention with reference to the attached drawings in which.

DETAILED DESCRIPTION OF A PREFERRED EMBODIMENT OF THE INVENTION

Figure 1:
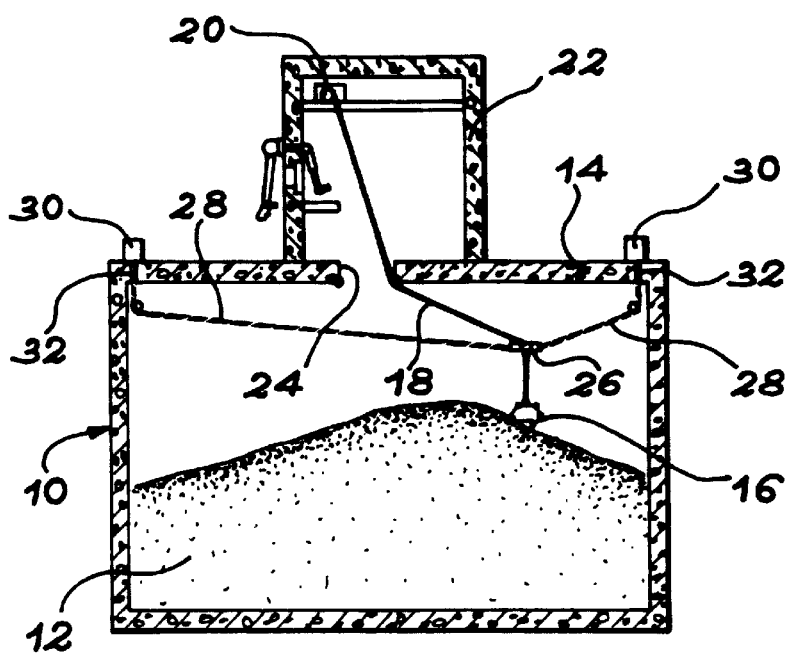
FIG. 1, already described, is a diagrammatic side view representing a noxious product storage silo in which collection equipment is installed, the positioning of the equipment being controlled by a blind guide system.
Figure 2:
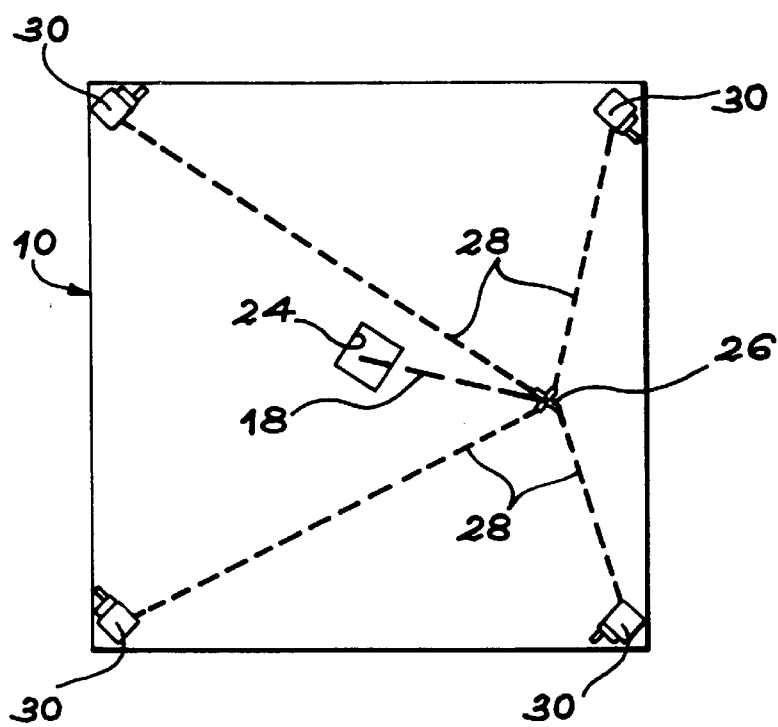
FIG. 2, already described, is a top view of the silo in FIG. 1, in particular showing the layout of the guide system positioning cables.
Figure 3:
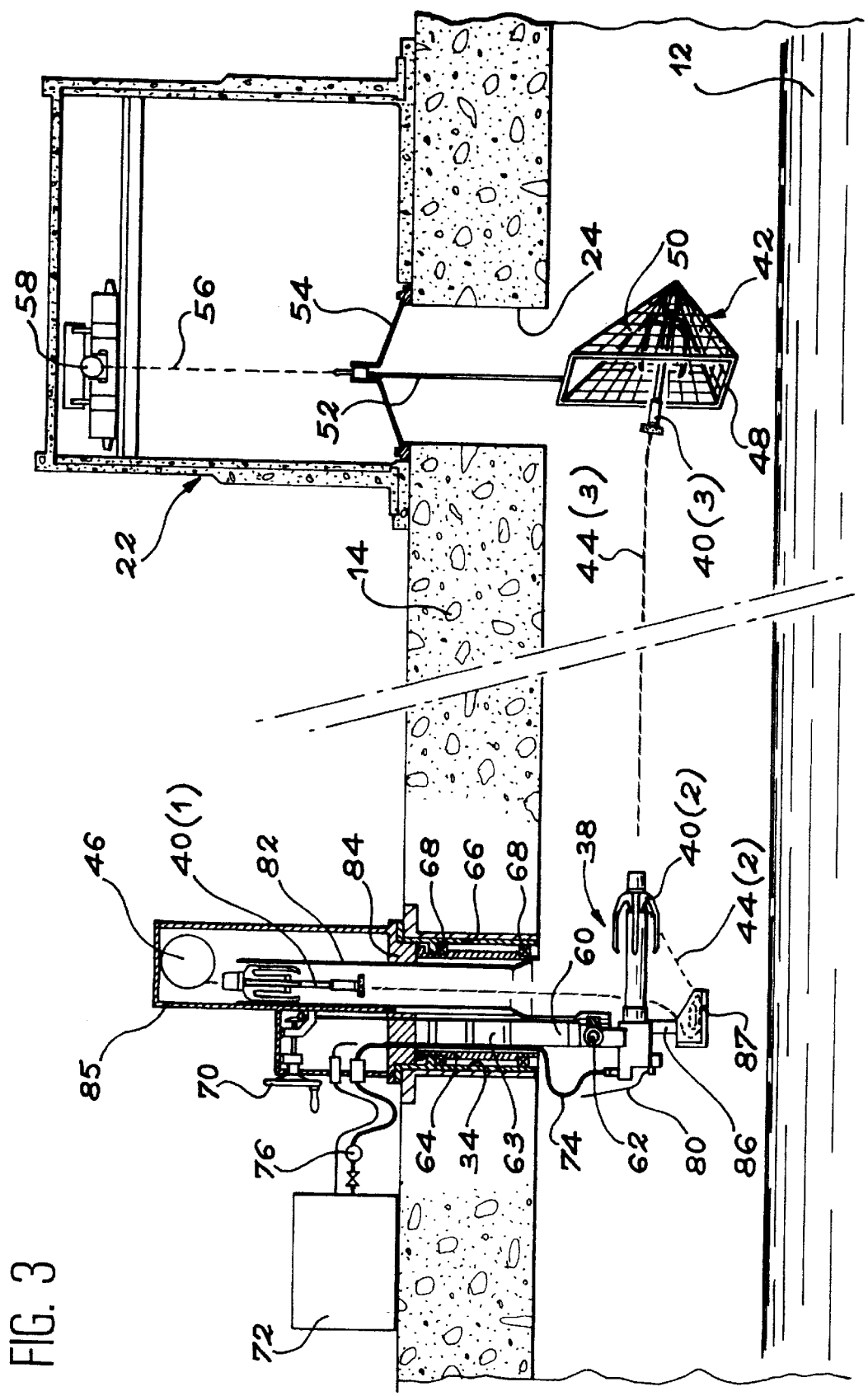
FIG. 3 is a vertical partial sectional view illustrating the placement of a cable under a slab in accordance with the process according to the invention, in the case in which the cable to be installed is a positioning cable for the guide system used in the silo in FIGS. 1 and 2.
Figure 4:
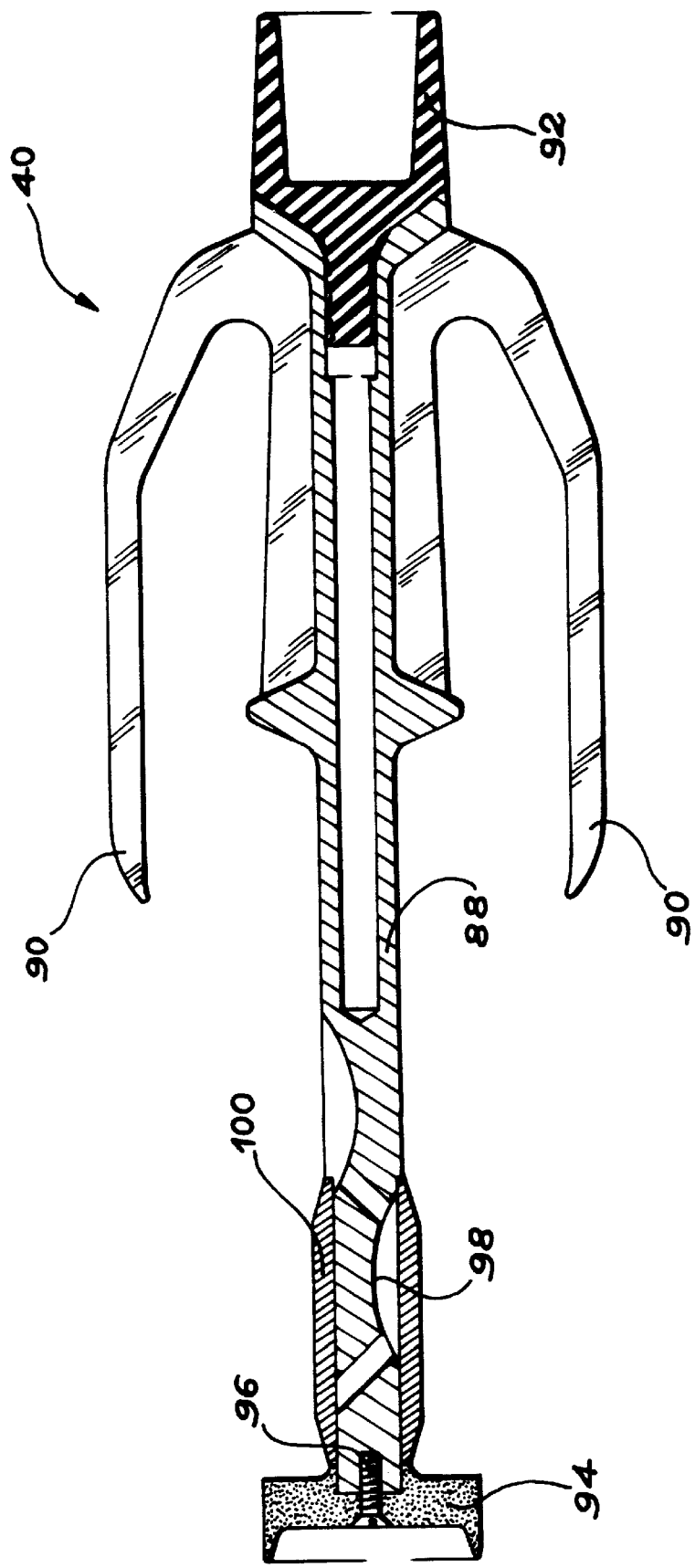
FIG. 4 is a longitudinal sectional view of the harpoon used for placement of the cable in accordance with the process according to the invention.

We will now refer to FIGS. 3 and 4 to describe a preferred embodiment of the process according to the invention, applied to the placement of one of the positioning cables 28 of the guide system used in the silo 10 in FIGS. 1 and 2 without any human intervention.

This process is based on the use of a gun 38 such as a compressed air gun that launches a projectile, in this case a harpoon 40, to a target 42. More precisely, the gun 38 and the target 42 are inserted under the slab 14 through holes 34 and 24 respectively, and are rotated to face each other. The gun is then fired so that the harpoon 40 is caught in target 42. The harpoon draws a hemp rope 44 with it that passes through the opening 34, the opposite end of the hemp rope being stored on an automatic winder 46 located above the second opening 34.

After firing, the target 42 is lifted into the collection cell 22 (illustrated at reduced scale in FIG. 3) through the first opening 24 and the hemp rope 44 is detached from harpoon 40. A first end of the cable 28 (FIGS. 1 and 2) to be installed under the slab 14 is then fixed to the opposite end of the hemp rope 44, and the hemp rope is then raised through the first opening 24, until the first end of the cable 28 is located in the collection cell 22. The first end of cable 28 is then attached on the guide device 26. The opposite end of cable 28 is then still passing through the same second opening 34, above which it is fixed to the corresponding winch 32 as described previously with reference to FIGS. 1 and 2.

As shown particularly in FIG. 3, the target 42 comprises a rectangular, annular or other shaped frame 48, the size of which enables it to pass freely through the first opening 24. The frame 48 supports a net 50, arranged such that the harpoon 40 is caught in it when it passes through the frame 48. The target 42 thus formed may be compared with the goal on a football field. However when it is horizontal, the horizontal upper part of the net 50 is not useful, so that it can be eliminated if necessary.

The target 42 is fixed to the lower end of a vertical rigid rod 52, such that the open front end of the target is located in an approximately vertical plane.

At its upper end, the rod 52 is mounted on a support 54, designed to be placed above the first opening 24. More precisely, the support 54 comprises at least three stands, arranged so that they can rest on the upper surface of the slab 14 around the first opening 24 when the target 42 is in position below the slab 14. The rod 52 then passes through the opening 24 approximately along its center line.

The upper part of rod 52 is installed in the support 54 such that it can rotate freely about its vertical axis when the support 54 is supported on slab 14. This arrangement enables an operator located above the slab 14 to rotate the target 42 towards the second opening 34, and therefore towards the gun 38 as will be described later.

In order to enable the target 42 to be inserted under the slab 14 through the opening 24, and placement of the support 54 on the slab, the upper end of the rod 52 is suspended from a sling 56 fixed to winch 58 located in the collection cell 22.

The winch 58 from which the target 42 is suspended may be the same as the lifting winch 20 described previously with reference to FIG. 1, or it may be a separate winch mounted on the same traveling crane. When the target 42 is lowered under the slab 14 through the opening 24, the winch 58 is placed vertically in line with this opening.

In the embodiment illustrated in FIG. 3, the gun 38 is a compressed air gun of the "multi-effect pneumatic launcher" type. The gun body 38 is hinged on a plunger 60 through a horizontal axis 62. The plunger 60 itself is installed such that it can move vertically inside a slide 63 formed in a ring 64. The ring 64 is installed in the second opening 34 from which the firing must be done, so that it can pivot around the vertical axis of this opening. This is why the ring 64 is mounted in a removable tubular support 66 that can fit into opening 34 through bearings 68.

The gun 38 may be pivoted around axis 62 by controlling it from the area above the slab 14 using a handwheel 70. Turning the control wheel 70 pivots the gun 38 about the axis 62 through an appropriate mechanism, for example including a worm screw engaged on a toothed wheel centered on the spindle 62 and connected to the body of the gun 38.

The gun 38 is powered with compressed air by a compressor or a compressed air cylinder 72 located on the slab 14 and connected to the gun through a hose 74 that is placed inside the ring 64. This hose 74 is provided with a manometer 76 capable of adjusting the firing pressure.

In order to start firing, the gun 38 is equipped with a jack forming an expansion chamber, or a gun controlled from the surface through a power supply cable 80 that also passes inside the ring 64.

Ring 64 also contains a duct 82 adjacent to the vertical slide 63, open at the bottom, through which harpoon 40 is passed. The gun 38 can thus be inserted (without its harpoon 40) in the duct 82, after pivoting upwards around spindle 62, such that its barrel is facing upwards.

The top part of the duct 82 located above the slab 14 is used to contain the harpoon 40, such that the front of the harpoon faces upwards. This harpoon ready position is denoted by reference 40 (1) in FIG. 3.

The top end of the duct 82, that is also open, is used to pass the hemp rope 44, one end of which is fixed on the harpoon 40 while most of the length of the hemp rope is wound on winder 46 located above the duct 82.

The tubular support 66 is closed at the top surface of the slab 14 by a plug 84 supported on ring 64. The duct 82, hose 74, power supply cable 80 and the mechanism to control pivoting of the gun 38 about spindle 62, all pass through this plug 84.

A mechanism (not shown) controlled from the area above the slab 14 also passes through the plug 84, and enables the plunger 60 to move vertically inside the slide installed in ring 64.

Above slab 14, the plug 84 also supports a structure 85 on which in particular the wheel 70 and the winder 46 are located.

A previously adjusted stop 86 connected to the plunger 60, limits the extent to which the gun 38 can tilt from its vertical position into its firing position illustrated in FIG. 3, when the gun pivots around the axis 62.

As illustrated in FIG. 3, the plunger 60 may also support a bowl 87 at its lower end underneath the gun 38, which before firing may contain a length of hemp rope 44 necessary for the firing, under specific conditions that will be described later.

As shown in detail in FIG. 4, in the preferred embodiment of the invention, the harpoon 40 comprises a rod 88 made of a light alloy provided with a number of teeth 90 (for example four) at its front end. More precisely, the teeth 90 extend outwards and then backwards starting from the front end of the rod 88 and parallel to it. An end piece 92 forming a shock absorbing stop is inserted in the recessed front end of the rod 88. This end piece, for example made of rubber, prevents the harpoon from damaging the silo tanking.

A thrust piston 94, for example made of "Nylon" (registered trade mark) is fixed at the rear end of the rod 88, for example by means of a screw 96. This piston 94 is designed to fit into the cylindrical chamber of the gun 38, to propel the harpoon when firing is controlled.

A helical groove 98 close to piston 94 is machined around the periphery of the rod 88. This groove 98 fixes one end of the hemp rope 44 onto the harpoon. Consequently, a ring 100 surrounds an end part of groove 98.

The process for placement of the cable according to the invention, applied to the placement of any one of cables 28 in FIGS. 1 and 2, is used in the manner that is described below with reference to FIG. 3.

Initially, the target 42 is lowered to the required height below the slab 14 through the first opening 24. It is lowered by the winch 58, after the winch has been put into position above the opening 24. It terminates when the stands of support 54 are located on the upper surface of slab 14, around opening 24.

The operator then orients the target 42 towards the second opening 34 starting from which the cable 28 must be inserted, and therefore starting from which the harpoon 40 must be fired. This rotation is made using a graduated horizontal dial (not shown) fixed with respect to slab 14, that is placed on top of the slab such that it is centered on the rod 52 that supports the target 42. An arrow (not shown) fixed onto rod 52 just above the fixed dial is also used, perpendicular to the plane of the frame 48 of the target and the rod 52. All an operator needs to do then is to make the arrow coincide with the graduation on the dial indicating the direction of the second opening 34 from which the firing is to be made, so that the rod can be rotated to face optimum direction.

During another step which may take place before, during or after the step in which the target 42 is put into position and rotated, the gun 38 is inserted under the slab 14 through the second opening 34. This is done by putting the gun 38 in the vertical position, and the plunger 60 in the high position inside the slide 63 such that the gun is positioned coaxially inside the duct 82. Under these conditions, the tubular body 66 supporting the gun 38 through the ring 64 is placed in the opening 34.

The hemp rope 44 which is advantageously designed to be made from a non-wettable and floating material such as the material used for water skiing ropes, is then unwound from the winder 46 over a sufficient length to enable firing without pulling on the winder. In practice, the length of the hemp rope 44 unwound from the winder 46 is equal to at least the distance separating the openings 24 and 34.

This operation, which is designed to prevent blocking of the winder 46 during firing, is carried out by unwinding the hemp rope 44 and winding it on itself in a bowl 87 provided for this purpose under the gun 38.

The harpoon 40, to which the hemp rope 44 is fixed, is then loaded on the gun 38 through the vertical duct 82. Note that the hemp rope may be unwound from the winder 46 before or after this loading operation.

The gun 38 may then be brought into its firing position as shown in FIG. 3. This is done by lowering the plunger 60 into the slide 63 fitted in ring 64 to a previously adjusted low position, bringing the gun 38 to an elevation about the same as the elevation of the target 42 under the slab 14. The gun 38 equipped with its harpoon 40 then pivots downwards in a vertical plane about axis 62 to its firing position slightly above the horizontal. This firing position is fixed when the body of the gun comes into contact with the previously adjusted stop 86. It corresponds to a previously adjusted elevation angle formed at the time of firing between the barrel of the gun and a horizontal plane.

The gun 38 is then oriented in azimuth, in other words the firing direction is adjusted, so that it is oriented towards the target 42. In particular, this adjustment may be made using a graduated horizontal fixed dial (not shown) located above the slab 14 and centered on the vertical pivot axis of the gun that in this case coincides with the center line of the opening 34. A marker point on this dial indicates the exact direction of the first opening 24. A needle (not shown) located immediately above this dial is fixed to the vertical axis of rotation of the gun and is therefore fixed to the gun azimuth. An operator can then rotate the gun 38 around its vertical axis so that the needle is coincident with the marker point on the dial. There is then no doubt that the gun is pointed towards the target 42. References 40 (2) and 44 (2) represent the state of the harpoon and the state of the hemp rope respectively when this operation is terminated.

In the next step, before the firing itself, the pressure in the pressure chamber of the gun 38 is modified to the required value. This pressure is adjusted taking account of the dimensional characteristics of the silo to take account of the distance from the gun 38 to the target 42, and the deflection in the trajectory of harpoon 40, knowing that all firings made are straight line firings. This pressure is adjusted by the manometer 76 fitted on the supply hose 74 of the gun pressure chamber.

An operator, always above the slab 14, then triggers the firing. The projectile composed of the harpoon 40 passes through the frame 48 of target 42 in which it is caught by the recovery net 50. The harpoon 40 entrains the previously unwound length of the hemp rope 44 with it as it moves. This hemp rope is strong, but sufficiently thin to be as lightweight as possible. The weight of the hemp rope 44 is determined so that the firing precision of the harpoon is not reduced. References 40 (3) and 44 (3) in FIG. 3 show the harpoon and the hemp rope respectively, after firing.

The target 42 is then raised through the first opening 24 using the winch 58. The harpoon 40 and the first end of the hemp rope 44 fixed to the harpoon are then recovered. This first end of the hemp rope 44 recovered in the collection cell 22 is then detached from harpoon 40.

The other end of the hemp rope 44, which up to this point was attached to the winder 46, is then detached from this winder and fixed to a first end of the cable 28 (FIGS. 1 and 2) that is to be put into place. The opposite end of this cable 28 is then fixed to the positioning winch 30 that is mounted on slab 14 close to the second opening 34.

The end of the hemp rope that is located in the collection cell 22 is then pulled until the first end of the cable 28 has been retrieved through the first opening 24.

In the application in which cables 28 are put into position as shown in FIGS. 1 and 2, this first end of the cable 28 is then fixed to the guide device 26 and all previously described operations are repeated until all other cables 28 have been put into place in the installation. The guide device 26 is then inserted under the slab 14 through opening 24 and the cables 28 are tensioned using positioning winches 32 until the guide device 26 is positioned approximately vertically in line with opening 24.

However, the process according to the invention is not limited to this application. On the contrary, it may be used in all cases in which it is required to put a cable into place under a slab between two relatively distant openings in this slab, whenever human intervention below the slab is impossible.

If the mechanical strength and the weight of the cable to be inserted are comparable to the characteristics of the hemp rope 44 in the described application, the cable may be fixed to the harpoon 40 directly. The cable is then put into place directly after firing and the target is pulled up above the slab.

Finally, note that although the use of the harpoon and the net guarantee efficient operation of the process, other projectiles associated with different types of targets may also be used without going outside the framework of the invention.

What is claimed is:

1. Process for placement of a cable (28) under a slab (14) between a first and a second opening (24, 34) passing through the slab, characterized by the fact that it comprises the following steps:

lower a target (42) under the slab (14) through the first opening (24), and rotate the target towards the second opening (34);

lower a gun (38) under the slab (14) through the second opening (34), and rotate the gun towards the target (42);

fire a projectile (40) from the gun (38), attached to the cable (28) or a hemp rope (44) that can be connected to a cable, this projectile being caught by the target (42);

raise the target (42) above the slab (14) through the first opening (24), and disconnect the cable or the hemp rope.

2. Process according to claim 1, in which the target (42) comprises a frame (48) supporting a net (50) and the projectile is a harpoon (40).

3. Process according to either of claims 1 and 2, in which the target (42) is suspended from a support (54) by a rigid vertical rod (52), the target (42) being lowered until the support (54) comes into contact with the upper surface of the slab (14) around the first opening (24).

4. Process according to claim 3, in which the target (42) is oriented by rotating the rod (52) supporting the target (42) about its center line with respect to the support (54).

5. Process according to claim 3, in which the target (42) is oriented by making an arrow fixed onto the rod (52) above the slab (14), coincide with a graduation of a fixed horizontal dial placed above the slab and centered on the rod (52), this graduation indicating the direction of the second hole (34).

6. Process according to claim 1, in which the cable (42) is lowered by means of a sling (56) connected to a winch (58) located above the first opening (24).

7. Process according to claim 1, in which the projectile (40) is loaded onto the gun (38) after the gun is lowered under the slab (14).

8. Process according to claim 7, in which the gun (38) is loaded through the top by inserting it vertically through a loading duct (82) that passes through the second opening (34).

9. Process according to claim 1, in which a length of hemp rope (44) or the cable (28) is unwound before firing, the length being equal to at least the distance separating the first and second openings (24, 34), from a winder (46) placed above the second opening (34).

10. Process according to claim 9, in which the said length of the hemp rope (44) or the cable (28) is unwound into a bowl (87) placed under the gun (38).

11. Process according to claim 1, in which the gun (38) is rotated into a previously adjusted elevation angle by lowering the gun until it comes into contact with a stop (86), and the gun is rotated in azimuth by pivoting the gun around a vertical axis through the second opening (34).

12. Process according to claim 11, in which the gun (38) is rotated in azimuth by making a needle fixed on the gun pivot axis above the slab (14) coincide with a mark on a second dial fixed horizontally above the slab and centered on this pivot axis, this mark indicating the direction of the first opening (34).

13. Process according to claim 1, in which the projectile (40) is attached to a hemp rope (44) and after the projectile has been detached, the other end of the hemp rope is attached to a first end of the cable (28) to be put into position, and the hemp rope (44) is pulled through the first opening until the first end of the cable is recovered.

14. Process according to claim 13, in which the other end of the cable (28) is fixed to a winch (32) located above the second opening (34).

* * * * *